(12) United States Patent
Rajachudamani et al.

(10) Patent No.: US 12,425,440 B1
(45) Date of Patent: Sep. 23, 2025

(54) ASSESSMENT OF THE ENTERPRISE NETWORK OF ANOTHER ORGANIZATION

(71) Applicant: Tanium Inc., Emeryville, CA (US)

(72) Inventors: Samrudh Rajachudamani, Chicago, IL (US); Christopher Horn, Rochester, NY (US); Daniel Varga, Rolesville, NC (US); Christopher Nabkey, Ada, MI (US)

(73) Assignee: Tanium Inc., Emeryville, CA (US)

( * ) Notice: Subject to any disclaimer, the term of this patent is extended or adjusted under 35 U.S.C. 154(b) by 300 days.

(21) Appl. No.: 18/315,497

(22) Filed: May 10, 2023

Related U.S. Application Data

(60) Provisional application No. 63/380,382, filed on Oct. 20, 2022.

(51) Int. Cl.
*H04L 29/00* (2006.01)
*H04L 9/40* (2022.01)
*G06Q 10/0635* (2023.01)

(52) U.S. Cl.
CPC ..... *H04L 63/1433* (2013.01); *G06Q 10/0635* (2013.01)

(58) Field of Classification Search
CPC .............. H04L 63/1433; G06Q 10/0635
See application file for complete search history.

(56) References Cited

U.S. PATENT DOCUMENTS

| 7,945,467 | B2* | 5/2011 | Moss ................... G06Q 30/018 705/317 |
| 8,086,729 | B1 | 12/2011 | Hindawi et al. |
| 9,722,895 | B1* | 8/2017 | Sarukkai ................. H04L 67/10 |
| 10,454,935 | B2* | 10/2019 | Parimi .................... G06N 5/025 |
| 10,485,536 | B2 | 11/2019 | Ming et al. |
| 10,715,542 | B1* | 7/2020 | Wei ....................... G06F 16/958 |
| 10,853,501 | B2 | 12/2020 | Brannon |

(Continued)

FOREIGN PATENT DOCUMENTS

WO 2021055268 A1 3/2021

OTHER PUBLICATIONS

"4 Ways to Optimize IT, Security, and Third-Party Risk Management," 2022, 1 page, OneTrust LLC.

(Continued)

*Primary Examiner* — Don G Zhao
(74) *Attorney, Agent, or Firm* — Nicholson De Vos Webster & Elliott LLP

(57) ABSTRACT

A cloud service to facilitate performance by a first organization of an assessment of an enterprise network of a second organization is described. According to one aspect, the cloud service performs the following operations with approval from the second organization. Specifically, the cloud service causes client software to be installed on a plurality of endpoints within the enterprise network to determine a first information regarding a current state of those endpoints. Also, the cloud service receives a second information that is based on the first information, and then causes a third information to be securely shared with the first organization. The third information is the second information or is based on the second information, and the third information is limited, through a set of one or more mechanisms, to that considered to be acceptable to share with another organization.

24 Claims, 4 Drawing Sheets

(56) References Cited

U.S. PATENT DOCUMENTS

| | | | | |
|---|---|---|---|---|
| 11,159,546 B1* | 10/2021 | Moore | | H04L 63/0254 |
| 11,172,470 B1 | 11/2021 | Guieu et al. | | |
| 11,258,654 B1 | 2/2022 | Hindawi et al. | | |
| 11,343,355 B1 | 5/2022 | Goela et al. | | |
| 11,544,656 B1* | 1/2023 | Manzano | | G06F 11/3692 |
| 11,570,197 B2* | 1/2023 | Cunningham | | H04L 67/306 |
| 11,755,586 B2* | 9/2023 | Poirel | | G06F 16/215 |
| | | | | 707/690 |
| 12,184,685 B2* | 12/2024 | Murray | | H04L 63/1416 |
| 2009/0271272 A1* | 10/2009 | Berkowitz | | G06Q 30/0271 |
| | | | | 705/14.67 |
| 2013/0298192 A1* | 11/2013 | Kumar | | H04L 63/1425 |
| | | | | 726/25 |
| 2015/0358360 A1* | 12/2015 | Bezilla | | G06F 21/552 |
| | | | | 726/1 |
| 2018/0146004 A1* | 5/2018 | Belfiore, Jr. | | G06F 21/577 |
| 2020/0090197 A1 | 3/2020 | Rodriguez et al. | | |
| 2020/0250213 A1* | 8/2020 | Duchin | | G06F 16/319 |
| 2020/0327221 A1* | 10/2020 | Street | | H04L 63/1425 |
| 2021/0234885 A1* | 7/2021 | Campbell | | H04L 63/20 |
| 2022/0166789 A1* | 5/2022 | Murray | | H04L 63/1416 |
| 2023/0077527 A1* | 3/2023 | Sarkar | | G06Q 10/0635 |
| | | | | 705/7.28 |
| 2023/0206329 A1* | 6/2023 | Cella | | G06Q 20/0855 |
| 2023/0214925 A1* | 7/2023 | Cella | | G06Q 30/06 |
| | | | | 705/37 |
| 2023/0259357 A1* | 8/2023 | Ishak | | G06F 8/71 |
| | | | | 717/122 |
| 2023/0362200 A1* | 11/2023 | Crabtree | | G06N 5/022 |
| 2024/0007497 A1* | 1/2024 | Murray | | H04L 63/0414 |
| 2025/0005487 A1* | 1/2025 | Sarkar | | G06Q 10/0635 |
| 2025/0117491 A1* | 4/2025 | Jasionowski | | G06F 21/577 |

OTHER PUBLICATIONS

"A Force Multiplier for Third-Party Cyber Risk Management," 2022, 1 page, Technology Case Study, Cyber GRX.
"CyberGRX Auto Inherent Risk (AIR) Insights™," 2022, 2 pages, AIR Insights™ Datasheet, Cyber GRX.
"CyberGRX Client Services," 2022, 2 pages, CyberGRX Client Services Datasheet, Cyber GRX.
"CyberGRX Framework Mapper," 2022, 2 pages, Framework Mapper Datasheet, Cyber GRX.
"CyberGRX Ransomware Threat Profile and Ecosystem View," 2022, 1 page, Cyber GRX.
"Integrating IT, Security & Third-Party Risk," 2022, 1 page, OneTrust LLC.
"Our world today: increasing IT complexity and vulnerability," 2022, 2 pages, Converged Endpoint Management Team, XEM, Tanium.
"Predictive Risk Profile," 2022, 4 pages, Cyber GRX.
"Tanium™ Appliance Deployment Guide," Mar. 24, 2023, 264 pages, Version 1.7.5, Tanium Inc.
"Tanium Appliance product brief, Get complete visibility into hardware and software assets," 2023, 3 pages, Data Sheet, Tanium.
"Tanium Asset," 2023, 2 pages, Data Sheet, Tanium.
"Tanium for Asset Discovery and Inventory," 2022, 4 pages, Solution Brief, Tanium.
"Tanium Reveal, Locate and Manage Sensitive Data Across Endpoints to Mitigate Exposure," 2021, 3 pages, Tanium.
"Tanium™ Risk User Guide," Jan. 25, 2023, 55 pages, Version 1.3.128, Tanium Inc.
"Tanium™ Trends User Guide," Mar. 14, 2023, 77 pages, Version 3.9.324, Tanium Inc.
"The Business Value of Third-Party Risk Management Software," May 2022, 13 pages, White Paper, OneTrust LLC.
"The Shift to Third-Party Trust Management: What is TPTM and why does it matter?," Feb. 2022, 8 pages, eBOOK, OneTrust Vendorpedia™ Third-Party Risk Exchange.
"The State of IT & Third-Party Risk," 2022, 1 page, OneTrust LLC.
"The Ultimate Guide to Data Governance," Apr. 2022, 11 pages, eBOOK, OneTrust LLC.
"Third-Party Risk: A Turbulent Outlook, Findings From a Dec. 2021 Research Study," Jan. 2022, 17 pages, OneTrust Vendorpedia™ Third-Party Risk Exchange, CyberRisk Alliance.
Fred Kneip et al., "Third-Party Cyber Risk Management," 2022, 50 pages, CyberGRX Special Edition, John Wiley & Sons.

* cited by examiner

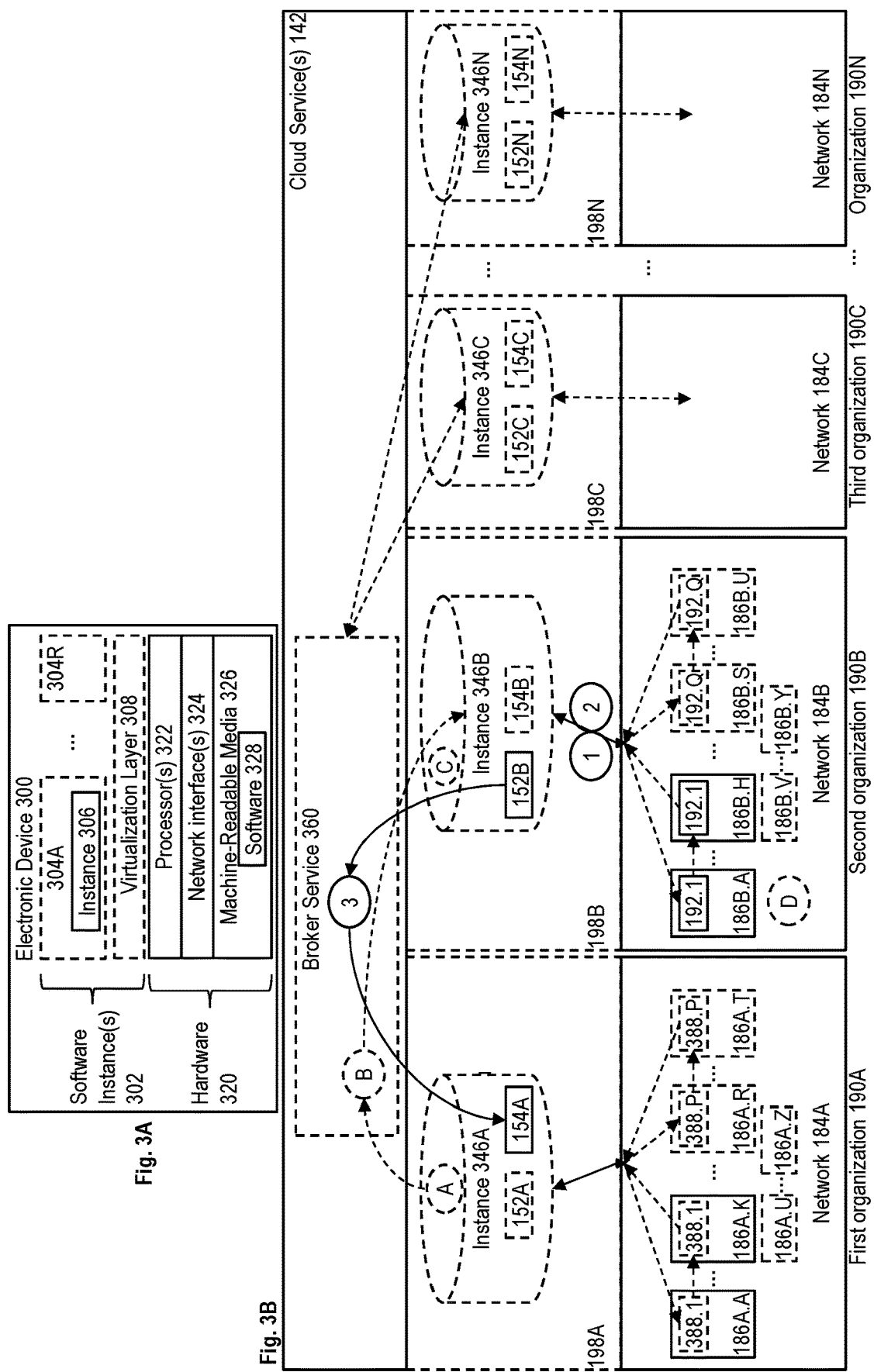

ASSESSMENT OF THE ENTERPRISE NETWORK OF ANOTHER ORGANIZATION

CROSS-REFERENCE TO RELATED APPLICATIONS

This application claims the benefit of U.S. Provisional Application No. 63/380,382, filed Oct. 20, 2022, which is hereby incorporated by reference.

TECHNICAL FIELD

One or more embodiments relate to the field of infrastructure assessment; and more specifically, to the assessment of the technical controls or other IT infrastructure elements within an enterprise network of another organization.

BACKGROUND ART

An organization sometimes has a need to request a cyber risk assessment of the technical controls of another organization's enterprise network. For instance, this can come up in the context of a first organization wanting or needing to perform such an assessment of a supplier's enterprise network.

One prior art technique for doing this includes a first organization requesting a second organization to complete a questionnaire, where the questions pertain to technical controls within the second organization's enterprise network. The completed questionnaire is returned to the first organization. This process can occur via mail (physical or electronic).

Since the second organization may be a supplier to many different organizations, the second organization may receive a questionnaire from a first set of organizations (often according to a schedule set by each of the different organizations) and/or send a questionnaire to a second set of organizations. The questionnaires may be the same but tend to have differences. To address this need there are questionnaire broker services. Such a broker service will provide standard questions that the second organization can fill out. Based on the answers to these standard questions, the broker will attempt to facilitate the preparation of responses to the questionnaires submitted to the second organization.

Additionally, the first organization may be a supplier to other organizations and/or the second organization may have its own suppliers. In other words, this questionnaire-based approach can be used at different points and/or all points along a "supply chain."

BRIEF DESCRIPTION OF THE DRAWINGS

The following figures use like reference numbers to refer to like elements. Although the following figures depict various example embodiments, alternative embodiments are within the spirit and scope of the appended claims. In the drawings:

FIG. 3A is a block diagram illustrating an electronic device according to some example embodiments.

FIG. 3B is a block diagram of a deployment environment according to some example embodiments.

DETAILED DESCRIPTION

The following description describes embodiments for, among other things, performing an assessment (e.g., a cyber risk assessment of the technical controls, other IT infrastructure assessments, etc.) of another organization's enterprise network. In this description, the figure(s) illustrating block diagrams sometimes refer to the figure(s) illustrating flow diagrams, and vice versa. Whether or not explicitly described, the alternative embodiments discussed with reference to the figure(s) illustrating block diagrams also apply to the embodiments discussed with reference to the figure(s) illustrating flow diagrams, and vice versa. At the same time, the scope of this description includes embodiments, other than those discussed with reference to the block diagrams, for performing the flow diagrams, and vice versa.

FIG. 1

Figure 1:
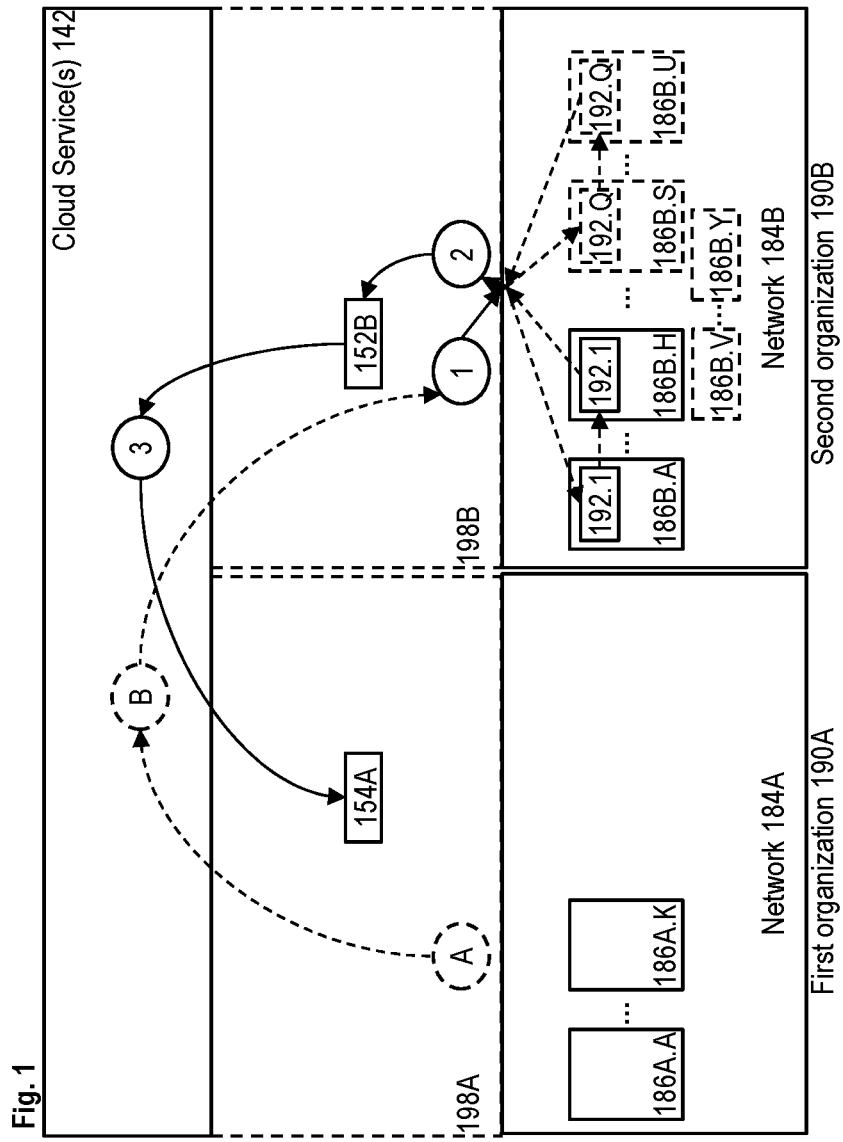
FIG. 1 is a block diagram illustrating a technique for performing an assessment of another organization's enterprise network according to some example embodiments.

FIG. 1 is a block diagram illustrating a technique for performing an assessment of another organization's enterprise network according to some example embodiments. Several of the reference numbers use the format #.x, where x is a letter used to distinguish different instances of the entity represented by the #. Different #s with the same letter for x represent a relationship between those entities. For instance, FIG. 1 shows two organizations 190 (a first organization 190A and a second organization 190B) and their respective networks 184 (network 184A and network 184B).

The networks 184 are sometimes called enterprise networks, information technology (IT) networks, managed networks, and organizations' networks, and represent the information technology (IT) infrastructure that an organization uses. A given one of the networks 184 may be a local area network (LAN) with a firewall through which traffic to and from the LAN passes to reach the cloud service(s) 142.

FIG. 1 shows different electronic devices 186 currently within each of the networks 184. The electronic devices 186 are referred to with the format 186x.x, where the first x distinguishes which of the network(s) 184 a given electronic device is currently connected to, and where the second x distinguishes electronic devices for each other. For instance, electronic devices 186A.A through 186A.K are currently within network 184A of the first organization 190A. In some embodiments, at least some of the electronic devices within a given one of the networks 184 are distributed across different geographical areas and/or localized at the same physical location. Additionally or alternatively, the electronic devices within a given one of the networks 184 are divided into several sub-networks that are separated by one or more firewalls.

Similarly, electronic devices 186B.A-B.H are currently within the network 184B of the second organization 190B. In some embodiments, each of the electronic devices 186B.A-186B.H viewed as a set or one or more endpoints, where the term endpoint refers to an entity that connects to and exchanges information with a network. Often, entities within a network are classified as endpoints or network elements/network devices (an electronic device that communicatively interconnects other electronic devices on the network, where these other electronic devices may themselves be operating as network devices or endpoints). While each of the electronic devices 186B.A-186B.H is generally referred to herein as an endpoint, alternative embodiments are implemented to participate at a lower level of granularity (e.g., if a given one of the electronic devices 186B.A-186B.H supports virtualization (see additional discussion below), then each of a set of one or more software containers hosted on that electronic device may be separately considered an endpoint). In such embodiments, there may be only one instance of the client software 192 per electronic device 186B.A-186B.H, or one per software container hosted on each of the electronic devices 186B.A-186B.H. The term electronic device is defined in more detail below.

Each of the electronic devices 186B.A through 186B.H has client software 192 installed on it. The client software, when executed by one of the electronic devices, causes the electronic device to: 1) scan that electronic device to collect information regarding the current state of that electronic device; and 2) communicate that information out of that electronic device. For instance, the scan is one that collects information that may be used to measure compliance of the electronic device with the check(s) identified in the assessment. These check(s) may reflect a request for a technical validation against specific benchmarks. Each of these check(s) can be viewed as a query to collect local results from the electronic devices in the network 184B of the second organization 190B.

FIG. 1 also illustrates areas 198 between the networks and cloud service(s) 142. The areas 198A and 198B are respectively associated with network 184A and 184B, and thus the first organization 190A and the second organization 190B. The areas 198 indicate that, in different embodiments, the content of that area may be part of the associated one of the networks 184 or part of the cloud service(s) 142. For instance, there may be an electronic device (e.g., operating as a server and referred to here as a gateway server) in area 198B, and depending on the embodiment that server may be within the network 184B or within the cloud service(s) 142. Cloud service(s) 142 provide shared resources, software, and information to electronic devices upon request. In cloud environments, software can be accessible over the internet rather than installed locally on in-house computer systems. Cloud services typically involve on-demand, over-the-internet provision of dynamically scalable and often virtualized resources.

Technological details can be abstracted from the users, who no longer need expertise in, or control over, the technology infrastructure "in the cloud" that supports them. Put another way, for each of the organizations 190.x, what is in each of areas 198.x may be on premise or in the cloud.

Also in FIG. 1, area 198B is shown as having information 152B regarding the network 184B of the second organization 190B, and that information 152B being provided through the cloud service(s) 142 to the first organization 190A as information 154A in area 198A. The information 154A is often referred to as a "report," and that report is being sent to someone other than the owner of the electronic devices, the owner/operator of the network 184B, the employer of the employees using the electronic devices (assuming the second organization is an employer), etc.

Since access to an organization's network is typically carefully controlled, one organization does not typically have access (or at least very limited access) to another organization's network. However, in FIG. 1 the client software 192 installed on the electronic devices 186B.A-186B.H within the network 184B of the second organization 190B are providing information 152B as information 154A to the first organization 190A. In some embodiments, the technique in FIG. 1 is made acceptable to the second organization using one or more of the following approaches: 1) the cloud service(s) 142 are provided by a third party; 2) the second organization 190B is provided an opportunity to accept or reject the provision of the information 154A to the first organization 190A; and 3) the information 154A is limited, through a set of one or more mechanisms, to a type of information considered to be acceptable to share with another organization. In different embodiments, each of the approaches 2 and 3 in this list can be implemented at different points in the process and at multiple points in the process. For instance, as described later herein approach 2 may be implemented at circled 1 and/or 2; approach 3 may be implemented at circled A, in client software 192, and/or circled 3. Further, where there is some relationship between the first and second organizations (e.g., the second organization is a supplier to the first, the second organization may view the first organization and/or the provider(s) of the client software, the gateway software, and/or the cloud service(s) 142 as a "trusted party").

Example Advantages

This technique enables the automation of assessments (e.g., cyber risk assessments of the technical controls, other IT infrastructure assessments, etc.) within another organization's network based on a current state of electronic devices within that network. Put another way, data internal to the second organization 190B that pertains to the state/risk inside the second organization's environment (electronic devices) within the network 184B is provided to the first organization 190A. For example, this allows an organization to evaluate the security of its vendor/supplier's network (which is sometimes referred to vendor security assessment/risk and compliance management, a security status, a security assessment, a risk assessment, compliance with a security factor, and evaluating the security of and associated risk of relying on a second organization operating an enterprise network with which a plurality of electronic devices are communicatively connected).

The information 154A may be presented in a variety of formats, some of which are referred to as security status information, security metrics, risk ratings, etc.

Further, in the case where the electronic devices for which the current state is collected are endpoints, this technique enables the automation of assessments of another organization's network based on a current state of endpoints within that network. Put another way, data internal to the second organization 190B that pertains to the second organization's environment (endpoints within the network 184B) is provided to the first organization 190A. Thus, the technique can be used to perform a technical validation against specific benchmarks on second organization's (the vendor/supplier's) endpoints. By way of non-limiting example, information 154A regarding the state of endpoints may include or reflect an organization's overall size, asset landscape, network architecture, endpoint state, endpoint usage, energy expenditures, compliance, vulnerabilities, file registry changes, log file contents, presence of sensitive or personal data, benchmark comparisons, location of managed and unmanaged assets, patching, threat presence and response, applied software policies, and network and endpoint performance, other cyber risk assessment information, among others. By way of a specific example that involves a cyber risk assessment, data internal to the second organization 190B that pertains to the state/risk inside the second organization's environment (endpoints within the network 184B) is provided to the first organization 190A; such as whether endpoints have the most recent software patches installed, password protection turned on, encryption tools enabled, VPN connections utilized, antivirus protection enabled, the presence of wanted or unwanted software, the presence of wanted or unwanted hardware, software uptime, software version information, network connectivity data, and so on.

As indicated above, the assessment is based on current state. The client software 192 on each of the electronic devices 186B.A-186B.H is collecting state information regarding the electronic devices (e.g., endpoints) on which that client software is executing, and the third information is based on that state information. Since this information is current as of the time of collection, since the process of collecting it is automated, and since it is collected from the electronic devices (e.g., endpoints) themselves, the technique provides for near real-time results as compared to a manual questionnaire approach. Put another way, as compared to a questionnaire which reflects answers generated via a relatively slow, long and/or time- and effort-consuming process (e.g., sending a questionnaire, collecting answers responsive to the request, and sending the answers back) or at a point in time (e.g., still the sending and receiving process, but collecting the answers based on previously collected data), the technique described herein provides a result based on data collected from the electronic devices (e.g., endpoints) themselves responsive to each request in an automated manner. Moreover, questionnaire responses may be inaccurate as compared to an automated interrogation. As such, the third information provided to the first organization 190A is much closer to real time information than the questionnaire approach and may additionally or alternatively lower the burden on the organization's employees.

Further, the automated nature of the technique described herein enables a variety of abilities. For example, the first organization 190A can monitor on an ongoing basis the IT infrastructure inside the network 184B of the second organization 190B (e.g., on a more frequent basis than the questionnaire approach, on-demand and/or on a schedule). As another example, the technique can be used to proactively respond to emergent threats. In the past, when a vulnerability becomes known, the first organization 190A needs to ask the second organization 190B if there is any exposure (e.g., the first organization 190A sends an email, and in response the second organization 190B checks, composes an answer, sends it). Using the technique described herein, the provider of the client software and/or the gateway server software can react to the vulnerability by adding a new check, and in response an assessment with the new check may be performed (e.g., immediately, on a schedule, and/or as part of an existing assessment (which may or may not already have a schedule set for it)). For instance, the provider of the client software and/or the gateway server software may notify the first organization 190A and/or the second organization 190B, which in turn may cause an assessment with the new check to be performed. Thus, the technique may be used to quickly respond to zero-day vulnerabilities, avoiding any potential disruptions to business operations.

Also, the assessment performed by the technique described herein is provable by the state of electronic devices (e.g., endpoints) because the technique described herein provides a result based on data collected from the electronic devices (e.g., endpoints) themselves responsive to each request in an automated manner. This contrasts with a questionnaire approach in which a person is writing responses to questions. In fact, even if the second organization has some form of internal mechanism to collect data from electronic devices in its network to generate a report, the information must either be converted by a person into responses to the questions on a questionnaire or the report provided directly to the first organization 190A (e.g., in the form of a PDF). Either way, there is room for error and/or purposeful skewing of the results (e.g., the second organization editing the report before sending it, incorrect use/configuration of the second organization's internal mechanism to collect data, limitations of the second organization's internal mechanism to collect data, etc.) as compared to reliance on the provider(s) of the cloud service(s) 142, client software, and/or gateway server software which is typically chosen by the first organization 190A. Thus, the technique described herein can be used to allow organizations with customer-supplier relationships to have the suppliers securely share with their customers a technical validation of the supplier's network against specific benchmarks (suppliers provide automated validation with associate technical proof).

Embodiments are generally described in the context of a request/response model, and optionally described as using a broker service. Such a model may take a variety of forms. In a first example (sometimes referred to a forwarding type of broker), the first organization's gateway server (which may be on prem or in the cloud) may submit a request via a message (which could be sent according to a schedule) to a broker, and the broker will forward the message to the second organization's gateway server (which may be on prem or in the cloud). When the second organization's gateway server sends a responsive message, the broker forwards the response to the first organization's gateway server. In a second example (sometimes referred to as a "doorbell" or "push alert" type broker), upon receipt of the message from the first organization, the broker stores the message and notifies the second organization's gateway server that the broker has a message but does not forward the message. Rather, the broker waits for the second organization's gateway server to request the message. The same is true for the response message. As a third example (sometimes referred to as a "polling" type broker), upon receipt of the message from the first organization, the broker just stores the message for the second organization, and the second organization's gateway server is implemented to periodically poll the broker for any new messages. In all three of these examples, the broker is "providing" the request and response messages to the intended recipients, they differ in whether the broker does so by automatically forwarding, notifying but awaiting a request, or simply waiting to be polled for new messages.

While the embodiments described herein are generally described in the context of a request/response model, some embodiments may additionally or alternatively use a different model. For example, some embodiments additionally or alternatively support a publish/subscribe model. With reference to FIG. 1, circled A would represent someone in the first organization 190A causing an electronic device to initiate a subscription to an assessment (e.g., a cyber risk assessment of the technical controls) of the network 184B of the second organization 190B. Thus, the request by the first organization 190A would be a request to subscribe. Also, the trigger described later herein would be generated responsive to a need/desire by the second organization to generate and publish results to any subscriber(s).

FIG. 2A

Figure 2A:
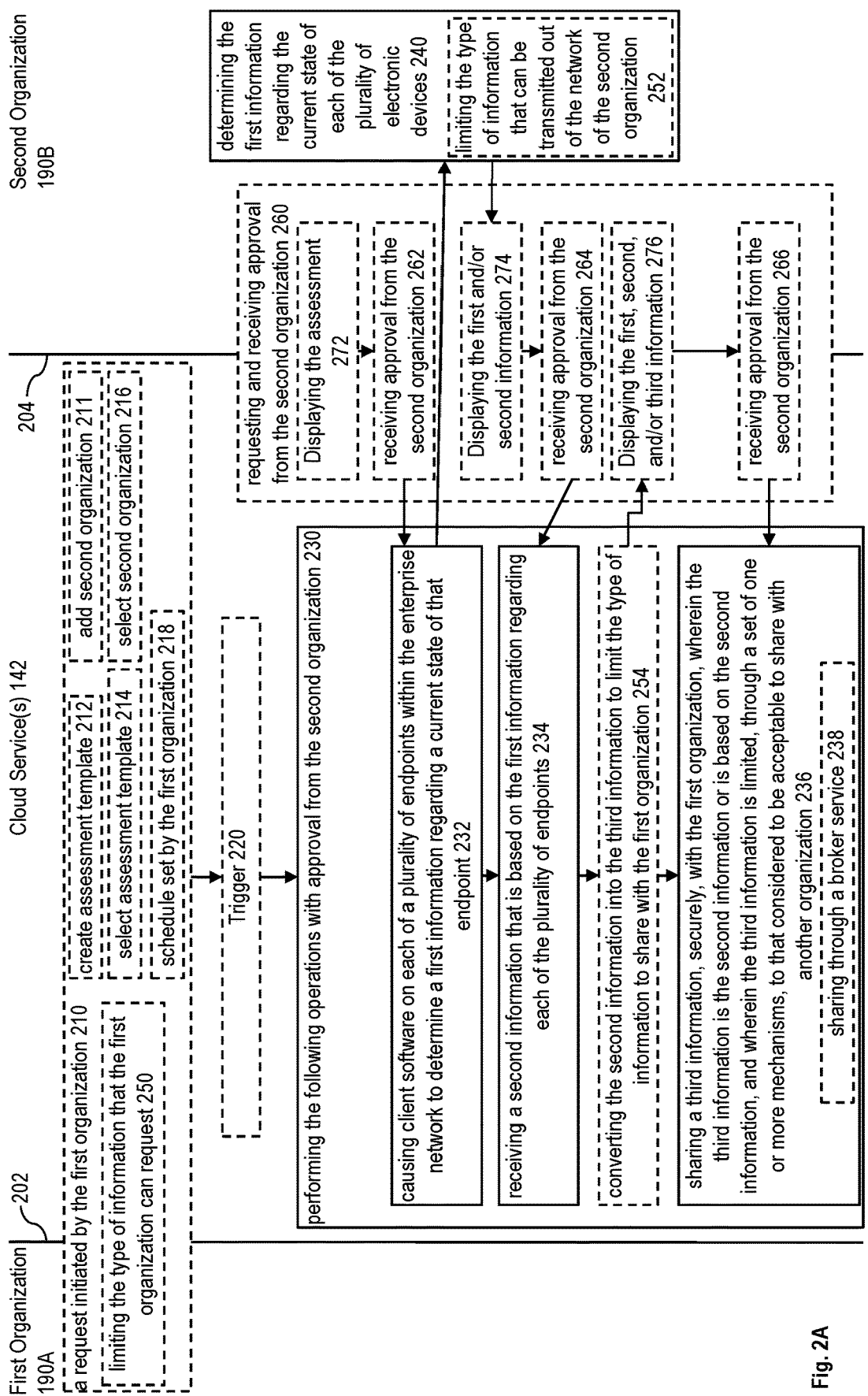
FIG. 2A is a flow diagram illustrating a technique for performing an assessment of another organization's enterprise network according to some example embodiments.

FIG. 2A is a flow diagram illustrating a technique for performing an assessment of another organization's enterprise network according to some example embodiments. The technique shown in FIG. 1 will be described with reference to FIG. 2A. FIG. 2A is divided into three sections by lines 202 and 204 to reflect which entity or entities, as well as which resources, are or may be involved in different ones of the operations shown. From left to right, the sections are for the first organization 190A, the cloud service(s) 142, and the second organization 190B. Blocks of the flow diagram spanning one of the lines 202 or 204 represent operations that may be performed by either or both entities separated by that line working together. For instance, the first block 210 (which is optional and spans the line 202) shows that a request is initiated by the first organization. Thus, with reference to FIG. 1, circled A represents someone in the first organization 190A causing (as an on-demand event and/or via a schedule) an electronic device to initiate a request for an assessment (e.g., a cyber risk assessment of the technical controls) of the network 184B of the second organization 190B. In an embodiment in which area 198A is part of network 184A, this electronic device (e.g., a server) may be within area 198A (and thus, within the network 184A) and the initiation is configured using software executing on this electronic device; in contrast, in an embodiment in which area 198A is part of the cloud service(s) 142, this electronic device may be in the cloud and being communicated with (e.g., via a web browser) over the internet by another electronic device within or outside of the network 184A.

Block 210 may include one or more other operations, such as the creation of an assessment template (block 212), adding the second organization to the system (block 211), selecting an assessment for the request (block 214), selecting the second organization as the recipient of the request (block 216), and setting a schedule on which the request will be periodically sent (block 218). From block 210, control passes to block 220.

Block 220 represents a trigger (which is optional). As represented by circled B in FIG. 1, this trigger may come from the cloud service(s) 142 responsive to: 1) a request/schedule of the first organization (e.g., where the first organization's gateway server sends a request, on demand or per a schedule, via a message to a broker service in the cloud, which in turn provides (e.g., by forwarding or responsive to retrieval initiated by the second organization's gateway server as a result of periodic polling and/or responsive to a push alert from the broker) the request to the second organization's gateway server) and/or the second organization (e.g., where the cloud service(s) 142 support a subscriber/publisher model and the second organization is a publisher); 2) a request from another party (e.g., a party that monitors threats and determines that a request should be initiated); and/or 3) the provider(s) of the client software, gateway server software, and/or the cloud service(s) 142 deciding on its own to do so. While the trigger is shown as originating from the cloud service(s) 142 (see circled B in FIG. 1 and block 220 in FIG. 2A), the trigger may additionally or alternatively be generated from other sources. For example, this trigger can come from within the network 184B (not shown in FIG. 1) (e.g., on-demand and/or according to a schedule set by someone at the second organization using an electronic device within the network 184B), such as: a) where the cloud service(s) 142 support a subscriber/publisher model and the second organization is a publisher; b) responsive to an emergent threat where the results are sent to any other organization that typically sends assessment requests to the second organization; c) responsive to an out of band request (e.g., email, phone call, etc.) from the first organization; etc.). As another example, the trigger may come from a gateway server inside the area 198B (not shown in FIG. 1). Where the trigger originates from within the area 198B, the trigger comes from either the cloud service(s) 142 or the network 184B depending on which the area 198B (e.g., a gateway server) is part of. From block 220, control passes to block 230.

In block 230, the operations in blocks 232, 234, and 236 are performed with approval from the second organization. When block 220 is implemented, block 230 is performed responsive to the trigger. In FIG. 2A, the cloud service(s) 142, executing on hardware coupled over a network (e.g., the internet) to the enterprise network of the second organization, performs block 230. While FIG. 2A shows block 230 as being performed by the cloud service(s) 142, as expressed with regard to block 220 the trigger may be initiated by the second organization; in which case, blocks 232, 234, and 236 are still performed responsive to the trigger, but block 232 may be performed by the second organization 190B.

In block 232, client software installed on each of a plurality of endpoints within the enterprise network is caused to determine a first information regarding a current state of that endpoint. In FIG. 1, this is represented by an arc/line from circled B to circled 1 and from circled 1 to the client software 192 on each of the electronic devices 186B.A-186B.H. While FIG. 2A shows block 232 as being performed by the cloud service(s) 142, as expressed with regard to blocks 220 and 230 the trigger may be initiated by the second organization; in which case, blocks 232, 234, and 236 are still performed responsive to the trigger, but block 232 may be performed by the second organization 190B. From block 232, control passes to block 240. This passage of control spans line 204 representing that block 240 is performed by electronic devices within the network of the second organization.

As shown by block 240, information regarding the current state of each of the plurality of electronic devices is determined. Referring to FIG. 1, this is done by each of the electronic devices 186B.A-186B.H, responsive to executing the client software 192, scanning the electronic device to collect information regarding the state of that device. This is sometimes referred to here as first information. FIG. 2A shows that control can pass from block 240 through some optional block to reach block 234.

In block 234, the cloud service(s) 142 receives a second information that is based on the first information regarding each of the plurality of endpoints. While in some embodiments the second information is a collection of the first information from each of the electronic devices 186B.A-186B.H, in other embodiments the second information is a summary of the collection of the first information from each of the electronic devices. In FIG. 1, the circled 2, the arc therefrom to information 152B, and the arc therefrom to circled 3 represents the flow of information to the cloud service(s) 142. Thus, there may be an electronic device (e.g., operating as a server as referred to as a gateway server) within area 198A receiving information sent from the electronic devices 186B.A-186B.H and sending information on. Depending on the embodiment, the electronic device operating as the gateway server in area 198B may be: 1) receiving the various pieces of the first information and sending that information on; 2) receiving the various pieces of the first information, generating the second information, and sending both or only the second information on; or 3) receiving the second information and sending it on. From block 234, control passes through an optional block to block 236.

In block 236, the cloud service(s) cause the sharing of a third information, automatically and securely, with the first organization. The third information is the second information or is based on the second information, and the third information is limited, through a set of one or more mechanisms, to a type of information considered to be acceptable to share with another organization. In FIG. 1, the arc from circled 3 to information 154A represents the flow of the third information to the first organization 190A.

Examples of Limiting Information

In block 236, the type of information considered to be acceptable to share with another organization can take different forms and/or formats in different embodiments. In some embodiments, the type of information reflects a total number or a percentage of electronic devices as opposed to specifics about each of the electronic devices. For example, in some embodiments, the type of information is limited using a tally approach. For instance, a first, second, and third tally respectively reflecting the number of the plurality of endpoints for which the first information respectively reflects yes, no, and not applicable (where not applicable can be used for a variety of reasons, such representing those of the electronic devices that are not running the Windows® operating system (from Microsoft Corporation) in the results of a check specific the Windows® operating system). By way of specific example, assuming that a check of the assessment pertains to whether antivirus software is installed, the third information may be limited to reflecting: 1) Yes for a first number of the electronic devices 186B.A-186B.H; 2) No for a second number of the electronic devices 186B.A-186B.H; and 3) not applicable for a third number of the electronic devices 186B.A-186B.H; where each of the first, second, and third numbers is 0 or a positive integer. Continuing this example and assuming that electronic devices 186B.A-186B.H are endpoints, the third information is limited to reflecting: 1) Yes for a first number of the endpoints; 2) No for a second number of the endpoints; and 3) not applicable for a third number of the endpoints. The third information may be displayed (e.g., to the first and/or second organization) in a variety of ways (e.g., actual numbers, percentages, GUI elements, etc.). While in some embodiments the type of information considered to be acceptable to share with another organization reflects a total number or a percentage of electronic devices/endpoints, other embodiment additionally or alternatively support other types of information (e.g., a pass/fail for each check of an assessment, etc.). In the exemplary case of pass/fail, in some embodiments the criteria for pass/fail may be identified as part of the assessment template (see block 212) and include, for example, a threshold percentage of the electronic devices that must pass the check for the organization to receive a pass for that check. Additionally or alternatively, a pass/fail indication may involve a group of the checks (sometime referred to as a "control), where there is a criterion for the group of checks (e.g., expressed in terms of aggregating the results of the individual checks in the group, such as a threshold number, a percentage, etc. of the individual checks in the group met those individual check's criteria) that must be met for the organization to receive a pass for that group of checks.

Thus, the type of information considered to be acceptable to share with another organization not including specifics about the electronic devices means that the information shared does not include any "device identifiable information" (e.g., no IP addresses, computer names, or other characteristics of an individual machine that would allow one to identify a specific machine has a specific state). In other words, in some embodiments, the type of information considered acceptable to share is aggregated data reflecting a distribution across the organization as opposed to being at the granularity of individual devices. However, as described later herein, in some embodiments, the second organization 190B is provided an opportunity to include explanation(s) along with the third information provided to the first organization 190A; in some such embodiments, these explanations may include specific(s) about one or more of the electronic devices.

The set of one or more mechanisms referred to in block 236 that limits the third information may be implemented (see also above discussion of approach 3) at one or more different points in the process. This is illustrated in FIG. 2A by optional blocks 250 (which is part of block 210), block 252 (which is part of block 240), and block 254 (which is part of block 230 and between blocks 234 and 236).

In block 250, the limiting is done by restricting the type of information that the first organization can request. For instance, in some embodiments an assessment includes a set of one or more checks; where each check is expressed in a way that it may be answered using a tally approach. Thus, in some embodiments, one aspect of limiting the type of information that the first organization can request is a tally for each of yes, no, and not applicable based on the first information collected from each of the plurality of endpoints. In FIG. 1, this is done at circled A in area 198A (e.g., it may be performed by software executing on an electronic device within the network 184A of the first organization 190A, via an electronic device within the cloud service(s) 142).

As shown in block 252, the limiting is done by limiting the type of information that can be transmitted out of the network of the second organization. Different embodiments may implement this differently. For instance, in some embodiments the client software is limited in the type of information it can collect (or at least what it can transmit out of the electronic device on which the client software is executing). In FIG. 1, this would be done via the implementation of the client software 192 installed on each of the electronic devices 186B.A-186B.H. In other words, the client software 192, regardless of what is asked to collect, will not collect (or at least will not transmit out of the electronic device on which it is executing) information other than the type considered to be acceptable to share with another organization. Additionally or alternatively, where the area 198B is part of the network 184B, an electronic device (e.g., a server) may receive the first information sent from each of the electronic devices 186B.A-186B.H and convert it into the second information for transmission to the cloud service(s) 142, thereby limiting the type of information that can be transmitted out of the network of the second organization.

In block 254, the limiting is performed by converting the second information into the third information to share with the first organization. With reference to FIG. 1, this is represented by the circled 3 and is performed by the cloud service(s) 142.

To put the above in the context of the second organization 190B, the second organization 190B may want assurances to participate in this system. These assurances may come in the form of any or all of the above blocks 250, 252, and 254. Regarding block 250, the second organization 190B may be shown the limitations on the type of information the first organization 190A can request. Regarding block 252, the second organization 190B may be shown: 1) that the client software 192 to be deployed within their network 184B is capable of only collecting (or at least capable of only sending outside of the electronic devices 186B.A-186B.H) information deemed acceptable to share with the first organization 190A; and/or 2) that, in the case where the area 198B is part of the network 184B, an electronic device (e.g., operating as a server and referred to as the gateway server) may be receiving information from the electronic devices 186B.A-186B.H and be capable of only sending to the cloud service(s) 142 information deemed acceptable to share with the first organization 190A. For block 254, the second organization 190B may be shown that the second information is always converted by the cloud service(s) 142 into the third information, and thus that only the third information can be shared with the first organization 190A. In other words, even if information beyond what is considered acceptable to share with the first organization is received by the cloud service(s) 142, the cloud service(s) 142 will only share information considered to be acceptable to share with another organization.

Returning to FIG. 2A, block 236 is shown to include an optional block 238 in which the sharing is performed through a broker service. In additional or alternative embodiments, one or multiple broker services may be used in any suitable arrangement. The broker service may operate as a trusted intermediary, where different organizations enroll at the broker service and the broker service provides for secure messages between the organizations. Use of such a service may provide further assurance to the second organization 190B regarding the security of the system providing information about endpoints of the network 184B to the first organization 190A.

Example Benchmarks

As described above, the checks of the assessment may be against specific benchmarks. In some embodiments, the above pass/fail discussion is a way to express the criteria for a benchmark. Additionally or alternatively, the criteria for benchmarks can be expressed relative to other organizations for which the cloud service(s) 142 has such information (e.g., all such organizations; those of such organizations that are similar in terms of size, industry, and/or other characteristics and/or in terms of also being a supplier of the first organization; etc.). For instance, the criterion for passing a particular check or group of checks may be determined relative to how other organizations have done relative to that same check or group of checks.

Additionally or alternatively, in some embodiment, benchmarks are expressed in the third information in terms of showing how the second organization performed relative to organizations for which the cloud service(s) 142 has such information (e.g., all such organizations; those of such organizations that are similar in terms of size, industry, and/or other characteristics and/or in terms of also being a supplier of the first organization; etc.). Such information could, for example, show how the second organization performed relative to the average and/or mean of the performance of the other organizations. This would allow the first organization to understand how the second organization is performing against other organizations (e.g., peers of the second organization, other suppliers of the first organization, etc.), and optionally track that performance over time and/or track industry trends. In addition, this provides the first organization meaningful data to use to encourage suppliers to improve their IT risk and prioritize risks across the entire attack surface. This can include setting goals for remediation efforts that are tied to board-level leadership's security objectives. For instance, a board of directors' security goal may be to avoid a financial and/or reputation impact security event, and this type of benchmark can provide prioritization of what to fix. While different embodiments may present different information, in some embodiments the benchmarks include one or more of the following categories and subcategories: Enterprise risk including overall risk, system vulnerability, system compliance, administrative access, password identification, expired certificates, and insecure TLS/SSL; Security including out of date antivirus, firewall disabled, high severity vulnerabilities, impact rating of machines with alerts, average alerts per day, missing antivirus, and missing disk encryption; and Operations including exploit impact score, patch compliance, meantime to patch, meantime to update, and software update compliance.

Example Approval(s)

Additionally, FIG. 2A shows optional block 260. In block 260, there is a request for and receipt of approval from the second organization before information is shared with the first organization. This was previously referred to as approach 2 and can be implemented at different points in the process. Block 260 straddles line 204 representing that block 260 (or different subblocks in block 260) may be performed by the second organization 190B and/or the cloud service(s) 142. Thus, the sharing, with the first organization, information regarding the electronic devices operated by the second organization can be done automatically, securely, on demand, and with approval. This approval may be done once, on each incoming assessment, and/or on each outgoing result.

There are two types of subblocks within block 260:1) blocks 272, 274, and 276 that pertain to displaying content to the second organization 190B (or more precisely, to someone within the second organization 190B); and 2) blocks 262, 264, and 266 that pertain to receiving approval from the second organization. Each of these subblocks is optional. Also, while the figure shows blocks 272, 274, and 276 are respectively associated with and occur prior to blocks 262, 264, and 266, in some embodiment they are implemented differently (e.g., block 272 is implemented without block 262 or vice versa; block 266 is performed before 276).

Block 272 would occur responsive to the trigger (block 220) and before block 232. In block 232, the assessment being requested is displayed to the second organization. From block 272, control passes to block 262 at which approval is received from the second organization to proceed. This combination of display and approval provides the second organization a chance to see and accept the assessment (the check(s) that will be performed). If the second organization rejects the assessment (not shown), other operations are performed (e.g., the rejection is communicated to the first organization; the second organization is prompted to provide a reason for the rejection, and this reason may be provided to the first organization which may react to this rejection). In FIG. 1, block 262 is represented by circled 1. From block 262, control passes to block 232. In other words, there is a request and receipt of approval from the second organization prior to the causing in block 232.

Control passes from block 240 to Block 274, at which the first information from the electronic devices 186B.A-186B.H and/or the second information is displayed to the second organization. From block 274, control passes to block 264 at which approval is received from the second organization to proceed. If the second organization rejects (not shown), other operations are performed (e.g., the rejection is communicated to the first organization; the second organization is prompted to provide a reason for the rejection, and this reason may be provided to the first organization which may react to this rejection; the second organization is given a chance to cure as described below). In FIG. 1, block 264 is represented by circled 2. From block 264, control passes to block 234. In other words, there is a request and receipt of approval from the second organization after the causing in block 232 and prior to the receiving in block 234.

Control passes from block 254 (or block 234 if block 254 is not implemented) to block 276, at which the first information from the electronic devices 186B.A-186B.H, the second information, and/or the third information is displayed to the second organization. From block 276, control passes to block 266 at which approval is received from the second organization to proceed. This combination of display and approval provides the second organization a chance to see and accept the report that will be shared with the first organization. If the second organization rejects (not shown), other operations are performed (e.g., the rejection is communicated to the first organization; the second organization is prompted to provide a reason for the rejection, and this reason may be provided to the first organization which may react to this rejection; the second organization is given a chance to cure as described below). In FIG. 1, block 266 is represented by circled 3. From block 266, control passes to block 236. In other words, there is a request and receipt of approval from the second organization after the receiving in block 234 and before the sharing in block 236.

FIG. 2B

Figure 2B:
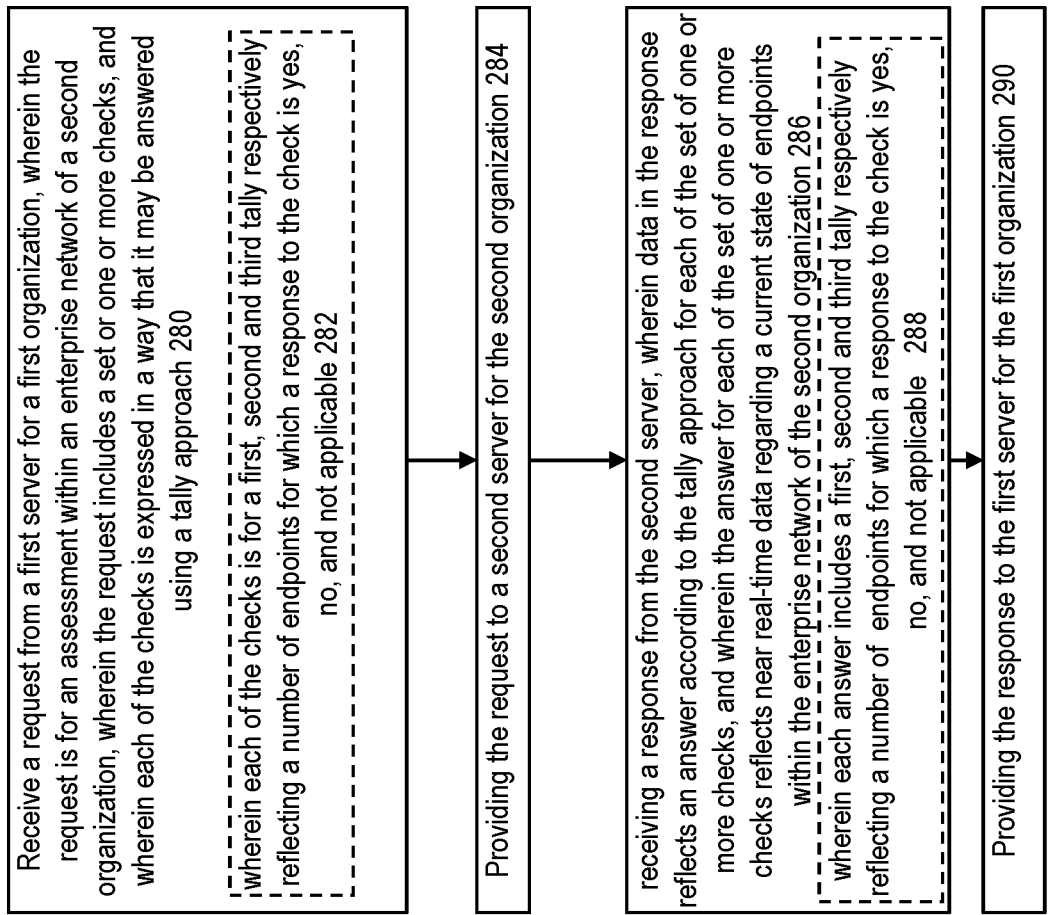
FIG. 2B is a flow diagram illustrating exemplary message contents in the context of the operation of a broker service according to some example embodiments.

FIG. 2B is a flow diagram illustrating exemplary message contents in the context of the operation of a broker service according to some example embodiments. Since FIG. 2B is from the perspective of a broker service, it may be used within the context of embodiments described with regard to FIG. 2A or with other embodiments.

In block 280, the broker receives a request from a first server for a first organization, wherein the request is for an assessment (e.g., a cyber risk assessment of technical controls) within an enterprise network of a second organization, wherein the request includes a set or one or more checks, and wherein each of the checks is expressed in a way that it may be answered using a tally approach. This tally approach may be similar to that previously described, and thus (as shown in optional sub-block 282) may such that each of the checks is for a first, second and third tally respectively reflecting a number of endpoints for which a response to the check is yes, no, and not applicable. From block 280, control passes to block 284.

In block 284, the broker provides the request to a second server for the second organization. As previously described, the broker may be "providing" the request and response messages to the intended recipients various ways, such as automatically forwarding, notifying but awaiting a request, or simply waiting to be polled for new messages. From block 284, control passes to block 286.

In block 286, the broker receives a response from the second server, wherein data in the response reflects an answer according to the tally approach for each of the set of one or more checks, and wherein the answer for each of the set of one or more checks reflects near real-time data regarding a current state of endpoints within the enterprise network of the second organization. As shown in optional sub-block 288, each answer may include a first, second and third tally respectively reflecting a number of endpoints for which a response to the check is yes, no, and not applicable. From block 286, control passes to block 290.

In block 290, the broker provides the response to the first server for the first organization.

Chance to Cure

As indicated above, some embodiments provide the second organization a chance to cure. For instance, responsive to display of the first, second, and/or third information, someone at the second organization may be provided an opportunity to improve the results by bringing one or more of the electronic devices 186B.A-186B.H into compliance with one or more of the checks in the assessment. Different embodiments may present this opportunity in different ways. For instance, some embodiments provide a window of time in which the second organization can attempt to improve compliance and then request the one, multiple, or all the checks in the assessment again on one, multiple, or all the electronic devices 186B.A-186B.H. The results of the second check(s) will replace the previously collected information for the corresponding first checks, and the display of the update results and opportunity to approve provided again to the second organization. In some such embodiments, this means one, some, or all checks in an assessment are rerun (each one or more time), but the third information provided responsive to the request is send only once and with only the results of the most recent run of each of the check(s).

Ability to add Explanation(s)

Additionally or alternatively, in some embodiments, the second organization 190B is provided an opportunity to include explanation(s) along with the third information provided to the first organization 190A. Depending on the embodiment, this could be a single explanation for the result sent and/or explanation(s) specific to one or more checks in the assessment. Providing the ability for the second organization 190B to add explanation(s) may be beneficial where the second organization 190B can anticipate follow-up questions from the first organization 190A, and thus eliminate or mitigate the need for one or more rounds of additional communications regarding the report. In addition, providing the ability for the second organization 190B to add explanation(s) may increase the second organization's comfort level with participating in the system.

Examples of Client Software

Different embodiments may implement the client software 192 differently. For example, some embodiments are implemented as a hub and spoke organization (where the client software 192 on each of the electronic devices communicates its information with an electronic device acting as server (e.g., the above discussed gateway server) in area 198B). Other embodiments apply a hierarchical organization. In yet others, the client software 192 is implemented to operate as a linear chain (also referred to as a ring, neighborhood, orbit, arc, series, propagation, propagation channel). In a linear chain approach, rather than a server (e.g., the gateway server) communicating with the client software on each electronic device, a message is passed along a sequence of the electronic devices (e.g., endpoints), collecting data as the message is passed from one to the next, and then the collected data is sent to a server (e.g., the gateway server). This reduces network traffic and increases speed. The message can be viewed as a query message (e.g., where each of the check(s) in the assessment is a separate query) to collect local results from the electronic devices in the network 184B of the second organization 190B. The client software 192 can be implemented such that the sequence of electronic devices (e.g., endpoints) is self-forming, and thus can handle a non-static collection of electronic devices. There are many variations on the linear chain approach that may be used. In addition to the techniques described below, in some embodiments a linear chain may be implemented as described in: application Ser. No. 16/854,844, issued as U.S. Pat. No. 11,172,470, and titled System, Security and Network Management Using Self-Organizing Communication Orbits in Distributed Networks; application Ser. No. 15/686,054, issued as U.S. Pat. No. 10,485,536, and titled Fast Detection and Remediation of Unmanaged Assets; application Ser. No. 16/917,800, issued as U.S. Pat. No. 11,258,654, and titled Parallel Distributed Network Management; and application Ser. No. U.S. Ser. No. 16/943,291, issued as U.S. Pat. No. 11,343,355, titled Automated Mapping of Multi-Tier Applications in a Distributed System.

According to a first variation, the sequence can be viewed as having a head (referred to as the head electronic device, head endpoint, head of the linear chain, head of the sequence) and a tail (referred to in similar fashion where "head" is replaced with "tail"). The message is sent to or starts at the head. Responsive to the message, the head electronic device performs the scan and adds data to the message. This data may be the first information and/or the second information, but regardless will reflect information regarding only the head electronic device at this point. The message is then forwarded to the next electronic device in the sequence, which does the same; as such, the message is accumulating data as it is sent along the sequence. Put another way, each of the electronic device 186B.A-186B.H receiving a message from its upstream neighbor acts upon the message by providing an update to the message based on its local state, performing some aggregation of the information in the message (e.g., by adding to or modifying aggregated results already included in the message as received from its upstream neighbor), and/or forwarding the message to its downstream neighbor along the linear chain. Thus, where the electronic devices 186B.A-186B.H are endpoints, the plurality of endpoints are caused to pass a message from one of the plurality of endpoints to a next one of the plurality of endpoints according to a predetermined sequence of the plurality of endpoints to determine the second information, where each of the plurality of endpoints modifies the message based on the first information regarding that endpoint before sending the message to the next one of the plurality of endpoints according to the predetermined sequence. Once the message reaches the tail electronic device, it does the same and then causes the message to be sent to the gateway server (e.g., sending it directly to the gateway server). This head/tail sequence approach is roughly reflected in FIG. 1 via an arrowed line from the circled 1 to the electronic device 186B.A, an arrowed line from electronic device 186B.A along the " . . . " (representing a set of zero or more electronic devices 186 that are also part of the sequence) to electronic device 186B.H, and an arrowed line from electronic device 186B.H to the circled 2. Thus, there is a respective communication channel between each pair of the electronic devices 186B.A-186B.H in the sequence. According to another variation, a similar sequence approach may be used, but the tail electronic device sends the message back to the head electronic device for it to cause that message to be forwarded to the gateway server.

While in some embodiments the messages both present the checks to be performed and collect the response to the checks, other embodiments operate differently. For example, other embodiments put different checks of an assessment into different messages (e.g., each check in a separate message, subsets of the checks in the assessment into different messages). As another orthogonal example, some embodiments use message(s) to distribute the checks (sometimes referred to as check messages, assessment messages, distribution messages, question messages, or query messages) and other messages to collect the responses (referred to as response messages, collection messages, answer collection messages, or report messages). These response messages may traverse the linear chain in the same or opposite direction as the check messages.

In some embodiments, while queries are passed from electronic device to electronic device along a linear communication orbit, individual queries can be directed to or targeted to a subset of the electronic device in a linear communication chain, so that only a specified subset of the electronic devices in the linear chain process the check.

In some embodiments, the self-forming aspect of the linear chain may be implemented via: 1) an electronic device that acts as a server and that facilitates the creation and maintenance of one or more of the linear chains (this electronic device may be the one acting as the gateway server or an elected one of the electronic devices 186B.A-186B.H); and/or 2) each of the electronic devices 186B.A-186B.H includes software (e.g., through application of a set of predetermined organization rules) that cause that electronic device to find its immediate neighbors and coordinate with these immediate neighbors to self-organize into a linear chain. In some embodiments, the linear chain may grow or contract as electronic devices join and leave network 184B (e.g., the network is non-static), through the independent local actions of the electronic device themselves.

FIG. 1 shows that other electronic devices (e.g., 186B.I through 186B.Y) may optionally be currently connected to the network 184B. Further, these other electronic devices may also participate in the cyber assessment (e.g., electronic devices 186B.-186B.U) and/or not (e.g., electronic devices 186B.V-186B.Y). Also, FIG. 1 shows that the electronic devices 186B.A-186B.U may be separated into different sets of electronic devices (e.g., 186B.A-186B.H and 186B.S-186B.U), where each set separately responds to the cyber assessment and the data is collated in the gateway server. In FIG. 1, the different sets of electronic devices that are participating in the cyber assessment may belong to different linear chains, where x in client software 192.x distinguishes the different linear chains (e.g., 192.1 through 192.Q). Further, some embodiments include additional servers (sometimes called zone servers) that each are to pass the information (e.g., in a collated form or each message) from respective sets of linear chains to the gateway server (such embodiments may be considered a cross between a hierarchical organization where linear chains can be viewed as leaf nodes or as extending from the leaf nodes of the hierarchy).

While the client software 192 is described as participating on behalf of each of the electronic devices 186B.A-186B.H, alternative embodiments are implemented to participate at a lower level of granularity (e.g., if a given one of the electronic devices 186B.A supports virtualization (see additional discussion below), than each of a set of one or more software containers may participate separately). In such embodiments, there may still be only one instance of the client software 192 on the electronic device, or one per each software container in the set of software containers.

Example Electronic Devices and Environments

Electronic Devices and Machine-Readable Media

One or more parts of the above embodiments may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals-such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, endpoints, or end user devices; or more specifically referred to as mobile devices, desktops, desktop computers, workstations, laptops, personal digital assistants, smartphones, wearables, augmented reality (AR) devices, virtual reality (VR) devices, mixed reality (MR) devices, embedded devices, Internet-of-Things devices (e.g., cameras, lighting, refrigerators, security systems, smart speakers, and thermostats), etc. The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

FIG. 3A is a block diagram illustrating an electronic device 300 according to some example embodiments. FIG. 3A includes hardware 320 comprising a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. In the electronic devices 186 of FIG. 1 that include client software (e.g., the above-described client software 192 and/or the below-described client software 388), the software 328 represents that software. In electronic devices used to implement the cloud service(s) 142, the software 328 represents the software to implement the cloud service(s) 142.

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine (such as Docker Engine by Docker, Inc. or rkt in Container Linux by Red Hat, Inc.) running on top of (or integrated into) an operating system, and it allows for the creation of multiple software containers 304A-304R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. The instantiation of the instance 306, as well as the virtualization layer 308 and software containers 304A-304R if implemented, are collectively referred to as software instance(s) 302.

Alternative embodiments of an electronic device may have numerous variations from that described above. For example, customized hardware and/or accelerators might also be used in an electronic device.

Environments

FIG. 3B is a block diagram of a deployment environment according to some example embodiments. Hardware (e.g., a set of one or more server devices) and software to provide cloud service(s) 142. In some embodiments, this hardware and software are in one or more datacenter(s). These datacenter(s) may be: 1) first party datacenter(s), which are datacenter(s) owned and/or operated by the same entity that provides and/or operates some or all of the software that provides the cloud service(s) 142; and/or 2) third-party datacenter(s), which are datacenter(s) owned and/or operated by one or more different entities than the entity that provides the cloud service(s) 142 (e.g., the different entities may host some or all of the software provided and/or operated by the entity that provides the cloud service(s) 142). For example, third-party datacenters may be owned and/or operated by entities providing public cloud services (e.g., Amazon.com, Inc. (Amazon Web Services), Google LLC (Google Cloud Platform), Microsoft Corporation (Azure)).

While the cloud service(s) 142 include the services previously described herein, some embodiments support additional services such as: asset discovery and inventory (also known as endpoint mapping); client management (including one or more of bare metal provisioning of new system and patching); monitoring activity in real time and reporting potential malicious behavior; identifying sensitive files on endpoints when they shouldn't be there (including looking inside of files); and threat hunting.

A user of an electronic device within or outside one of the networks 184 may communicate with the cloud service(s) 142 using TCP/IP (Transfer Control Protocol and Internet Protocol) and, at a higher network level, use other networking protocols to communicate, such as Hypertext Transfer Protocol (HTTP), a remote procedure call (RPC) framework (e.g., gRCP), an application program interface (API) based upon protocols such as Representational State Transfer (REST), etc. In an example where HTTP is used, an HTTP client, commonly referred to as a "browser," may be used on an electronic device to communicate HTTP messages with the cloud service(s) 142, thus allowing a user to access, process, and view information via pages and applications provided as part of the cloud service(s) 142, including allowing a user to interact with various GUI pages provided by the cloud service(s) 142.

Most, if not all, of the elements from FIG. 1 are included in FIG. 3B. Thus, the description will focus on those that are not in FIG. 1. For instance, FIG. 3B illustrates the previously described optional broker service as broker service 360, and the sending of the third information occurs through the broker service 360 that is part of the cloud service(s) 142. Additionally, FIG. 3B illustrates a variety of additional aspects and relationships that may exist between the organizations 190 and the cloud service(s) 142. To express these, FIG. 3B shows additional organizations 190, including a third organization 190C followed by " . . . " to an organization 190N. There is a respective network 184 and area 198 for each (e.g., the third organization 190C has associated with it a network 184C and an area 198C). Each of the areas 198$x$ optionally includes an instance 346$x$ associated with the respective network 184$x$ of the respective organization 190$x$. Each such instance 346$x$ is established to separate the data/operation for its respective organization 190$x$.

Also, each area 198$x$ optional includes data 152$x$ and data 154$x$. The data 152$x$ represents information regarding the electronic devices in the respective network 184$x$ of the respective organization 190$x$; while the data 154$x$ represents information (e.g., the previously described third information) regarding the electronic devices in one or more of the networks of one or more other organizations 190. For instance, the provider of the client software 192.$x$ and/or the cloud service(s) 142 may provide client software to one or more of the organizations 190 for that organization to analyze the electronic devices (e.g., endpoints) within its own network. Specifically, client software 388.$x$ may be provided to the first organization 190A for that organization to analyze the electronic devices 186A.A-186A.T on the network 184A (where the x in 388.$x$ distinguishes which linear chain in embodiments in which the linear chain approach is used). The client software 388.$x$ may be the same as the client software 192.$x$, or it may provide additional features and provide more data (e.g., information 152A). Put another way, the limits imposed on the information 154A of the second organization 190B shared with the first organization 190A may not apply to the information 152A regarding the electronic devices 186A.A-186A.T within the network 184A of the first organization 190A. For instance, the information 152A may include the first information collected from each of the electronic devices 186A.A-A.T. Thus, the first organization 190A may be using the client software 388.x for its own network, and the provider of the cloud service(s) 142 and/or client software 192 to perform the assessment (e.g., a cyber risk assessment of the technical controls) within the network 184B of the second organization 190B.

In a first scenario, the first organization 190A is already using the client software 388.x, and now wishes to purchase the ability to use the cloud service(s) 142 and/or client software 192 to perform the assessment (e.g., a cyber risk assessment of the technical controls) within the network 184B of the second organization 190B (e.g., because the second organization 190B is a supplier to the first organization 190A). Additionally, assume the second organization 190B is not already using the client software 192.x. In this case, the second organization 190B will be "added" to the system. The first organization 190A may pay for the client software 192.x, which may be a lightweight client because it is limited as described above. In response, the second instance 346B is set up (represented by circled C) and the client software 192.x installed/deployed (represented by circled D) on the electronic devices 186B.A-186B.U of the network 184B. In addition, the cloud service(s) 142 needs to be configured to allow for the sharing of data with the first organization 190A. Thus, the cloud service(s) 142 receiving the second information may include receiving the second information at a second instance 346B that was set up as part of the cloud service and that is for the second organization 190B, and the sharing includes sending the third information from the second instance 346B to the first instance 346A that was set up as part of the cloud service and that is for the first organization 190A. Later, the second organization 190B may: 1) decide to pay for the client software 192.x for the third organization 190C (e.g., because it is a supplier to the second organization 190B) to receive data 154B as a result of an assessment (e.g., a cyber risk assessment of the technical controls) within the network 184C of the third organization 190C; and/or 2) decide to pay for additional features to be added to the client software 192.x (such that it is similar to client software 388.x) so that the second organization 190B may analyze the electronic devices 186B.A-186B.U on its network 184B (in which case, the information 152B may represent information similar to the information 152A and be available to the second organization, but what of the information 152B that is shared as information 154A with the first organization 190A is limited as described above).

In a second scenario, the second organization 190B is already using the client software 192.x (to share information with other organizations and/or to analyze its own network 184B). Then, the first organization 190A (which may or may not be using client software 388.x) desires the ability to use the cloud service(s) 142 and/or client software 192 to perform the assessment (e.g., the cyber risk assessment of the technical controls) within the network 184B of the second organization 190B (e.g., because the second organization 190B is a supplier to the first organization 190A). Since the second organization 190B is already using the client software 192.x, that software need not be deployed/installed. Rather, the cloud service(s) 142 need to be configured to allow for the sharing of data with the first organization 190.

The pseudo equation "C [S] (s)-[C] S(s) . . . " represents various possible relationships: where "C [S]" refers to an organization that is a customer of the provider of the client software 388 and is optionally a supplier; "[C] S" refers to a supplier that is also optionally a customer of the provider of the client software; "(s)" means the relationships can be many to one, one to many, or many to many; and " . . . " means there more than layers. For example, C-CS-S indicates that: there is a first organization that is a customer of the provider of the client software; a second organization that is similarly a customer as well as a supplier to the first organization; and a third organization that is a supplier to the second organization, but not a customer of the provider of the client software. As another example, there may be a first organization that is a customer for at least (and possibly only) the ability to assess risk associated with vendor(s) of that organization, where the first organization has a second organization (which may or may not be a customer) as a supplier, and the second organization has a third organization (which may or may not be a supplier), and so on. In this case, the third organization may have client software 192 deployed and sharing results with the second organization, and the second organization may have client software 192 deployed and sharing results of the second organization (and in some embodiments, the results of the third organization) with the first organization.

The electronic devices 186A.U-186A.Z and 186B.V-186B.Y represent electronic devices that do not participate in the assessment, which may be for various reasons (e.g., these electronic devices may operate as network elements/network devices used to interconnect the electronic devices 186A.A-186A.T and 186B.A-186B.U, respectively).

Thus, the system in FIG. 3A provides a way that protects suppliers while still sharing the relevant assessment information with the customers of those suppliers. Also, this system may be implemented to allow for the sharing of anonymized data featuring industry peers and other third parties to demonstrate a given organization's comparatively better profile (e.g., a risk profile).

CONCLUSION

In the above description, numerous specific details such as resource partitioning/sharing/duplication embodiments, types and interrelationships of system components, and logic partitioning/integration choices are set forth to provide a more thorough understanding. The invention may be practiced without such specific details, however. In other instances, control structures, logic embodiments, opcodes, means to specify operands, and full software instruction sequences have not been shown in detail since those of ordinary skill in the art, with the included descriptions, will be able to implement what is described without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, and/or characteristic is described in connection with an embodiment, one skilled in the art would know to affect such feature, structure, and/or characteristic in connection with other embodiments whether explicitly described.

Bracketed text and blocks with dashed borders (e.g., large dashes, small dashes, dot-dash, and dots) may be used herein to illustrate optional operations and/or structures that add additional features to some embodiments. However, such notation should not be taken to mean that these are the only options or optional operations, and/or that blocks with solid borders are not optional in certain embodiments.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain embodiments, such order is exemplary and not limiting (e.g., alternative embodiments may perform the operations in a different order, combine certain operations, perform certain operations in parallel, overlap performance of certain operations such that they are partially in parallel, etc.).

While the above description includes several example embodiments, the invention is not limited to the embodiments described and can be practiced with modification and alteration within the spirit and scope of the appended claims. The description is thus illustrative instead of limiting.

What is claimed is:

1. A method for a cloud service to facilitate performance by a first organization of an assessment of an enterprise network of a second organization, the method comprising:
responsive to a trigger, the cloud service, executing on hardware coupled over a network to the enterprise network of the second organization, performing the following operations with approval from the second organization:
causing client software installed on each of a plurality of endpoints within the enterprise network to determine a-first information regarding a current state;
receiving a second information that is based on the first information regarding each of the plurality of endpoints; and
sharing third information, securely, with the first organization, wherein the third information is the second information or is based on the second information, and wherein the third information is limited, through a set of one or more mechanisms, to that considered to be acceptable to share with another organization, wherein the set of one or more mechanisms is the cloud service limiting the type of information that the first organization can request to a tally for each of yes, no, and not applicable based on the first information collected from each of the plurality of endpoints.

2. The method of claim 1, wherein the third information is limited to a first, second and third tally respectively reflecting a number of the plurality of endpoints for which the first information respectively reflects yes, no, and not applicable.

3. The method of claim 1, wherein the set of one or more mechanisms includes the client software.

4. The method of claim 1, wherein the set of one or more mechanisms includes the cloud service, responsive to receiving the second information, converting the second information into the third information.

5. The method of claim 1, wherein the trigger is a request initiated by the first organization.

6. The method of claim 1, wherein the trigger occurred according to a schedule set by the first organization.

7. The method of claim 1, wherein the sharing is performed through a broker service.

8. The method of claim 1, wherein the receiving the second information includes receiving the second information at a second instance that was set up as part of the cloud service and that is for the second organization, and wherein the sharing includes sending the third information from the second instance to a first instance that was set up as part of the cloud service and that is for the first organization.

9. The method of claim 1, wherein the operations include requesting and receiving the approval from the second organization responsive to the trigger.

10. The method of claim 1, wherein the causing client software includes causing the plurality of endpoints to pass a message from one of the plurality of endpoints to a next one of the plurality of endpoints according to a predetermined sequence of the plurality of endpoints to determine the second information, wherein each of the plurality of endpoints modifies the message before sending the message to the next one of the plurality of endpoints according to the predetermined sequence.

11. The method of claim 1, wherein the third information comprises a cyber risk assessment.

12. The method of claim 1, where the assessment of the enterprise network comprises a cyber risk assessment of technical controls.

13. A non-transitory machine-readable storage medium that provides instructions that, if executed by a hardware, are configurable to cause the hardware to perform operations that provide a cloud service to facilitate performance by a first organization of an assessment of an enterprise network of a second organization, the operations comprising:
responsive to a trigger, the cloud service, executing on the hardware coupled over a network to the enterprise network of the second organization, performing the following operations with approval from the second organization:
causing client software installed on each of a plurality of endpoints within the enterprise network to determine a-first information regarding a current state;
receiving second information that is based on the first information regarding each of the plurality of endpoints; and
sharing third information, securely, with the first organization, wherein the third information is the second information or is based on the second information, and wherein the third information is limited, through a set of one or more mechanisms, to that considered to be acceptable to share with another organization, wherein the set of one or more mechanisms is the cloud service limiting the type of information that the first organization can request to a tally for each of yes, no, and not applicable based on the first information collected from each of the plurality of endpoints.

14. The non-transitory machine-readable storage medium of claim 13, wherein the third information is limited to a first, second and third tally respectively reflecting a number of the plurality of endpoints for which the first information respectively reflects yes, no, and not applicable.

15. The non-transitory machine-readable storage medium of claim 13, wherein the set of one or more mechanisms includes the client software.

16. The non-transitory machine-readable storage medium of claim 13, wherein the set of one or more mechanisms includes the cloud service, responsive to receiving the second information, converting the second information into the third information.

17. The non-transitory machine-readable storage medium of claim 13, wherein the trigger is a request initiated by the first organization.

18. The non-transitory machine-readable storage medium of claim 13, wherein the trigger occurred according to a schedule set by the first organization.

19. The non-transitory machine-readable storage medium of claim 13, wherein the sharing is performed through a broker service.

20. The non-transitory machine-readable storage medium of claim 13, wherein the receiving the second information includes receiving the second information at a second instance that was set up as part of the cloud service and that is for the second organization, and wherein the sharing includes sending the third information from the second instance to a first instance that was set up as part of the cloud service and that is for the first organization.

21. The non-transitory machine-readable storage medium of claim 13, wherein the operations include requesting and receiving the approval from the second organization responsive to the trigger.

22. The non-transitory machine-readable storage medium of claim 13, wherein the causing client software includes causing the plurality of endpoints to pass a message from one of the plurality of endpoints to a next one of the plurality of endpoints according to a predetermined sequence of the plurality of endpoints to determine the second information, wherein each of the plurality of endpoints modifies the message before sending the message to the next one of the plurality of endpoints according to the predetermined sequence.

23. The non-transitory machine-readable storage medium of claim 13, wherein the third information comprises a cyber risk assessment.

24. The non-transitory machine-readable storage medium of claim 13, where the assessment of the enterprise network comprises a cyber risk assessment of technical controls.

\* \* \* \* \*